(12) United States Patent
Excoffier

(10) Patent No.: US 11,386,508 B2
(45) Date of Patent: Jul. 12, 2022

(54) GENERATION OF INDIVIDUAL PERSONALIZED PROFILE PER CONTACT

(71) Applicant: Thierry Excoffier, Pully (CH)

(72) Inventor: Thierry Excoffier, Pully (CH)

( * ) Notice: Subject to any disclaimer, the term of this patent is extended or adjusted under 35 U.S.C. 154(b) by 46 days.

(21) Appl. No.: 17/120,609

(22) Filed: Dec. 14, 2020

(65) Prior Publication Data

US 2021/0217107 A1    Jul. 15, 2021

Related U.S. Application Data

(60) Provisional application No. 62/961,256, filed on Jan. 15, 2020.

(51) Int. Cl.
| | | |
|---|---|---|
| *G06Q 50/00* | (2012.01) |
| *H04L 67/02* | (2022.01) |
| *H04L 67/306* | (2022.01) |
| *H04L 51/52* | (2022.01) |

(52) U.S. Cl.
CPC ............ *G06Q 50/01* (2013.01); *H04L 51/52* (2022.05); *H04L 67/02* (2013.01); *H04L 67/306* (2013.01)

(58) Field of Classification Search
CPC ....... H04L 51/32; H04L 67/02; H04L 67/306; G06Q 50/01
See application file for complete search history.

(56) References Cited

U.S. PATENT DOCUMENTS

| | | | |
|---|---|---|---|
| 7,269,590 B2 * | 9/2007 | Hull ...................... | G06Q 10/10 707/770 |
| 7,949,611 B1 * | 5/2011 | Nielsen ................. | H04L 67/306 705/319 |
| 9,094,390 B1 * | 7/2015 | Rao ......................... | H04L 51/32 |
| 2004/0093334 A1 * | 5/2004 | Scherer ............... | G06F 21/6245 |
| 2012/0290659 A1 * | 11/2012 | Rao ........................ | H04L 65/403 709/204 |
| 2012/0290660 A1 * | 11/2012 | Rao .......................... | H04L 51/32 709/204 |
| 2014/0032659 A1 * | 1/2014 | Marini .................. | G06Q 50/01 709/204 |
| 2014/0122653 A1 * | 5/2014 | Hosseini ................ | G06Q 50/01 709/219 |

* cited by examiner

*Primary Examiner* — Benjamin M Thieu
(74) *Attorney, Agent, or Firm* — Christopher Pilling

(57) ABSTRACT

A method of generating and displaying an individual personalized profile to each contact with the support of a system integrated in a community platform. Individuals must provide to the system a plurality of individual profiles ranked from the most to the least dominant. Next, individuals must define which of their profiles must be shared with each of their contact from the community platform. When individuals are sharing more than one of their profiles with a contact, the system generates an individual personalized profile comprising individual data aggregated from the most dominant individual profile shared with the contact, the second most dominant individual profile shared with the contact, and the third most dominant individual profile shared with the contact.

18 Claims, 3 Drawing Sheets

User Profiles:

User profiles shared with Contact #1:

User profiles shared with Contact #2:

GENERATION OF INDIVIDUAL PERSONALIZED PROFILE PER CONTACT

CROSS-REFERENCE TO RELATED APPLICATIONS

The present application claims priority to application No. 62/961,256, filed on Jan. 15, 2020, the disclosure of which is hereby incorporated in its entirety at least by reference.

BACKGROUND OF THE INVENTION

1. Field of the Invention

The present invention generally rates to community platforms and more particularly to a method of generating and displaying an individual personalized profile to each contact on a community platform.

2. Description of Related Art

Over the past 30 years, a vast number of social media, community websites and messaging apps have been created to interconnect people with each other in order to exchange pictures, content, messages on various themes. Usually, those platforms deal around a single theme such as traveling, business, or dating, but sometimes one platform may also deal with multiple themes. Any user of these platforms is required to create a profile for identification and interaction with other platform users. Such user profiles are often used by the system providers to record historical user's interactions within the system. With such data records, a provider triggers follow up actions such as sending an email, publishing personalized ads, or personalizing a user session environment. In addition, user profiles are convenient for users of a same platform to identify each other, to collect personal information describing a user, or to exchange with a user on various themes.

Although the rise of social media brought some good, it also brought some concerns around user privacy. The privacy of an individual can vanish in the blink of an eye over something that might have seemed very innocent. When you are dealing with the kind of reach and scale that these sites have, the time it can take for these mistakes to come back to bite you is extremely short. Because of this, people started paying closer attention to the management of their online reputation, which is the process of controlling the visibility of one's personal data when other users get access to his/her online profile.

One of the challenges for social media users, especially for those using platforms that deal with multiple themes, is the constraint to exchange on multiple themes with only one profile. This profile contains personal information that can be equally seen by an employer, a friend, a family member or an acquaintance. As soon as these people join a social platform, they can access the personal information of any user. In order to cope with such privacy issues, system providers have designed two following features:

a) They have allowed users to set their profiles either as private or public. When a profile is set as private, only a limited amount of user's personal information is visible to the wide community. However, a private status still provides enough information for other users to recognize the users and ask permission to get access to the private information.

b) System providers have allowed users to create groups of specific users with whom they can privately share specific content.

Although these two features provide an improved level of privacy between an individual and an online community, there is still a lack of developed features that address the privacy issues that users may encounter within a specific online community. A user may not always be willing to share the same personal information with a colleague, a client, a friend, a family member or an acquaintance.

The following platforms summarize well-known ones in relation to the claimed innovation:

a) Case 1—WhatsApp® Messenger Application: WhatsApp® Messenger is a cross-platform messaging. It allows registered users to exchange text messages, make video calls, and share images, documents, and other media with their contacts. Users are identified by the platform thanks to their phone numbers and they can identity their contacts thanks to their phone numbers. Users can complete their online information with a user status and a profile picture, which can be seen by any WhatsApp® user who has the user's phone number.

b) Case 2—Facebook® Social Media: Facebook® is a social networking platform that allows registered users to upload photos and videos, send messages and keep in touch with friends, family and colleagues. Each user can create a unique profile that is composed of an exhaustive list of personal information that he/she shares on Facebook®. Except for the profile picture, users have the possibility to set most of their information as visible either to only one contact, to a group of contacts, or to all the users of the website. Facebook users can discover another user thanks to his/her profile pictures along with any information that has been shared by the user with the Facebook® community.

c) Case 3—Google Sign-in: Google® Sign-in is an authentication system that reduces the burden of login for users, by enabling them to sign in on any website with their Google® Account—the same account they already use with Gmail® and other Google® services. Each user can create several Google® accounts and profiles. They can complete their profiles with a variety of personal information. Each time they join a website, which is partnered with Google®, they can choose one profile among the set of their profiles to associate with the website. They have the possibility to set specific profile information visible or invisible to the website community.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In one aspect of the invention a method of generating and displaying an individual personalized profile to each contact in a community platform is provided, the method comprising: with the support of a community platform, obtaining from each individual a plurality of individual profiles ranked from the most to the least dominant; obtaining one or a plurality of contacts; displaying one or a plurality of contacts to each individual and obtaining the individual's permission to share one or a plurality of the individual profiles with each individual's contact; displaying to each individual's contact an individual personalized profile comprising individual data aggregated from the most dominant individual profile shared with the contact, the second most dominant individual profile shared with the contact, and the third most dominant individual profile shared with the contact.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a method of displaying an individual personalized profile to each contact.

Such invention can provide an advanced privacy handling service for individuals (users) to manage their online reputation with a reduced complexity and effort.

Figure 1:
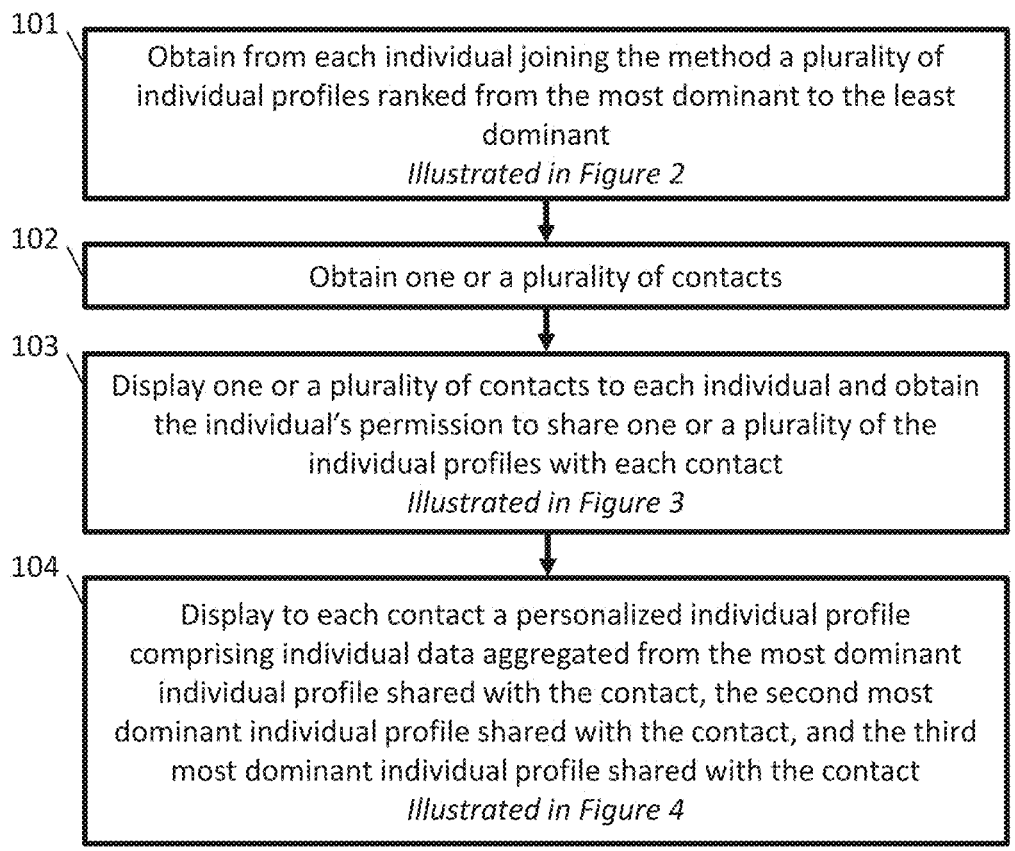
FIG. 1 illustrates the actions to execute the present invention according to an embodiment of the present invention.
Figure 2:
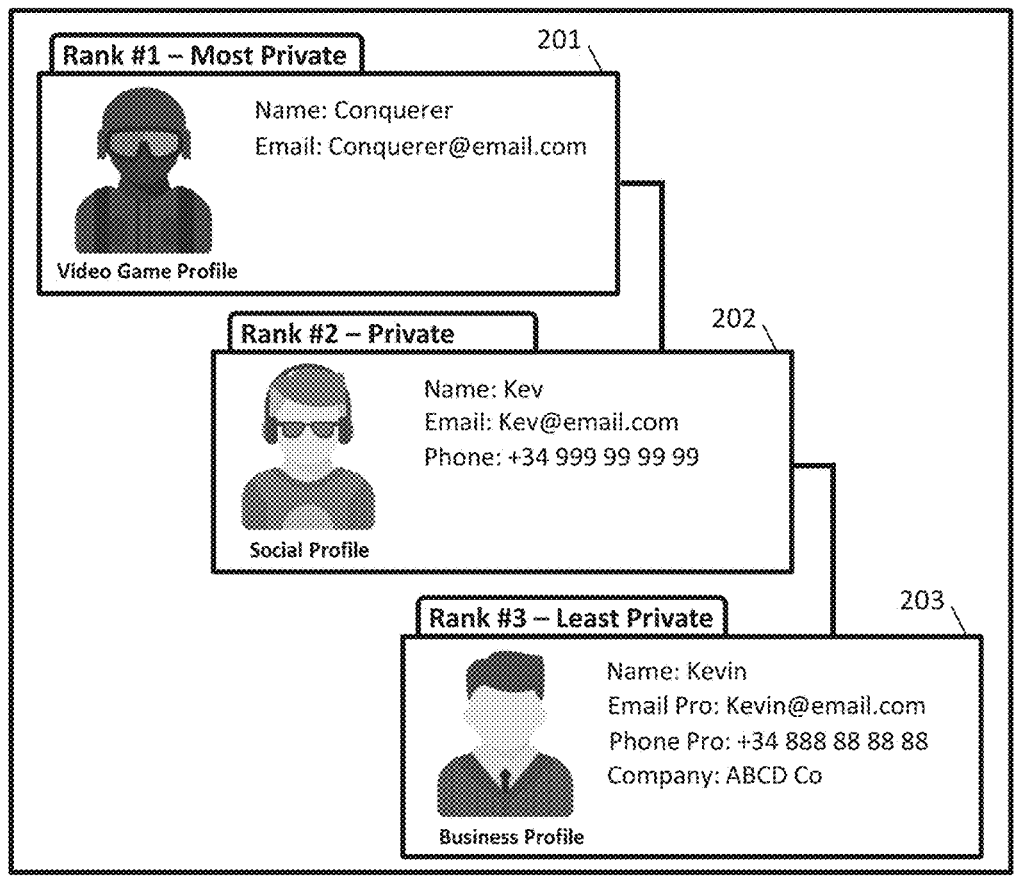
FIG. 2 illustrates a plurality of individual profiles ranked from the most private (201) to the least private (203) according to an embodiment of the present invention.
Figure 3:
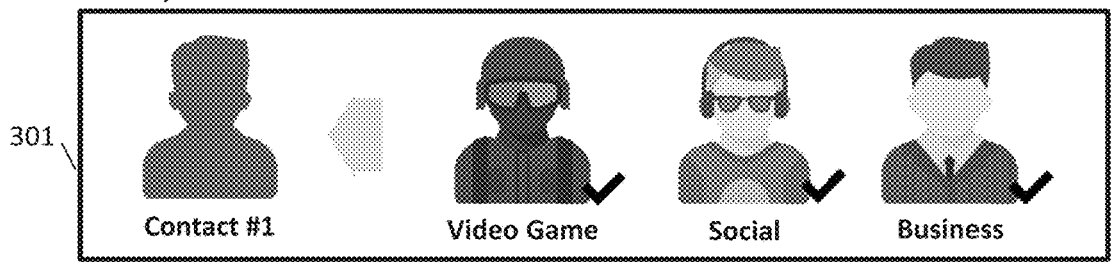
FIG. 3 illustrates the permissions of an individual to share a plurality of his/her profiles with two different contacts according to an embodiment of the present invention.
Figure 3:
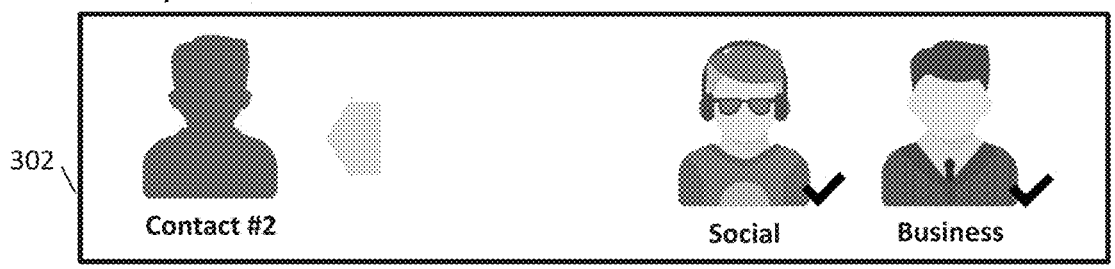
Figure 4:
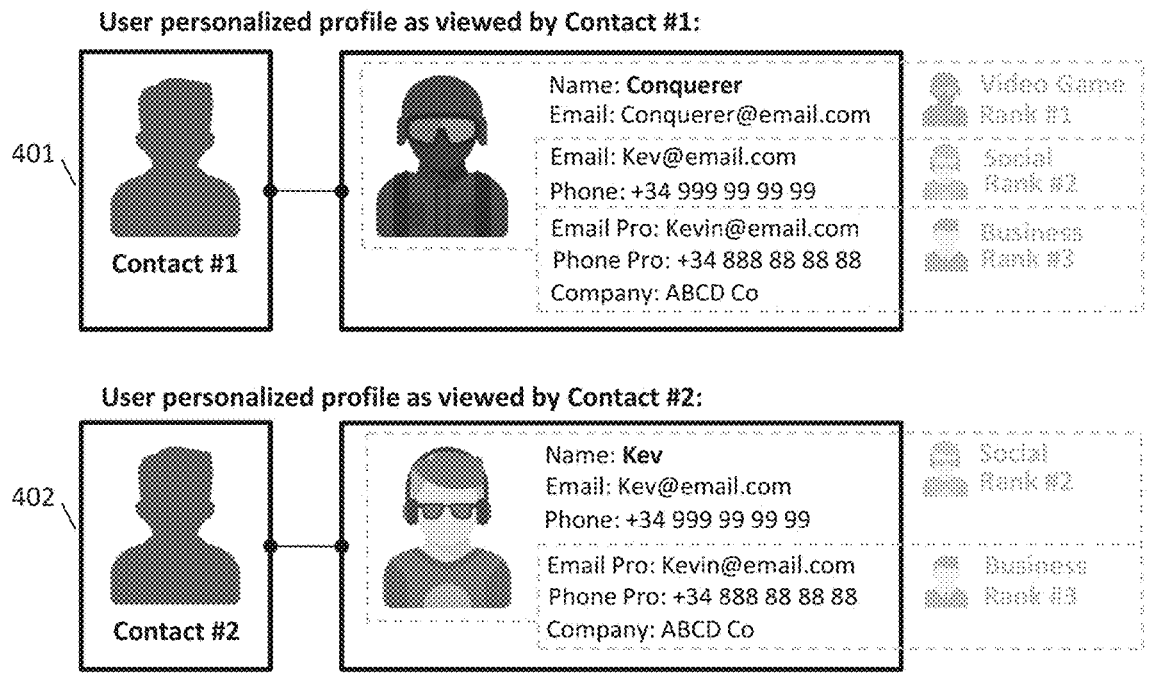
FIG. 4 illustrates the result and the display to each contact of an individual personalized profile comprising data aggregated from the most dominant individual profile shared with each contact, the second most dominant individual profile shared with each contact, and the third most dominant individual profile shared with each contact according to an embodiment of the present invention.

In one embodiment, a working example of this invention is a profile management method integrated in a multi theme social media platform that enables to create several targeted user profiles from a single user account (FIG. 4). In one embodiment, to exchange on several themes, a user can create several distinctive profiles (101, FIG. 2) that he/she will only use within a specific community: one profile for Business, one profile for Social, and one profile for Video Game. As users can connect on several themes, they can associate one or several of their profiles with each of their contacts (103, FIG. 3). Contacts include any individuals (users) with whom a user can eventually exchange messages with via the multi theme social media platform. Next, the user can decide to associate his Business and Social profiles with one of his contacts, classified as colleague (302), and the Business, Social and Video Game profiles with one of his contacts, classified as friend (301). As soon as the user has associated several profiles with a particular contact, a user personalized profile is generated by the platform for this contact. The method to generate such personalized profiles requires that a user rank his/her profiles from the most to the least private (FIG. 2). In one embodiment, the platform will set the least private profile as a public one, which means that any user of the platform can see the personal information that is included in this profile. Public profiles are useful for users to find their friends and colleagues via the social platform search tool. In the multi theme social media platform embodiment, the person can rank his/her Video Game profile as the most private (201), and the Business profile as the least private (203).

In one embodiment, to aggregate data from several user profiles and generate a user personalized profile, a platform administrator can define different rules and data categories. The following data categories are set:
a) Category 1 Profile Data consist of a profile picture, a user name, a first name, and a family name.
b) Category 2 Profile Data consist of a date of birth.
c) Category 3 Profile Data consist of a phone, an email, a home address.

In one embodiment, a platform administrator can define for each data category, the following rules:
a) Category 1 Profile Data always come from the most private profile. If no information is provided in the most private profile for Category 1 Profile Data, no information is displayed on the user personalized profile.
b) Category 2 Profile Data always come from the most private profile. If no information is provided in the most private profile, the information must come from the following profile as defined by the ranking, and so forth.
c) Any Category 3 Profile Data must be taken from all user profiles. The platform must remove any data duplicates.

Applying the above rules to the multi theme social media platform embodiment, the user personalized profile for the contact classified as colleague (402) will showcase:
a) The profile picture, the user name, the first name and the family name from the Social profile.
b) The date of birth from the Social profile or from the Business profile.
c) Any phone, email or home address from the Social and the Business profiles.

The user personalized profile for the contact classified as friend (401) will showcase:
a) The profile picture, the user name, the first name and the family name from the Video Game profile.
b) The date of birth from the Video Game profile, from the Social profile or from the Business profile.
c) Any phone, email or home address from the Video Game, the Social and the Business profiles.

Figure 5:
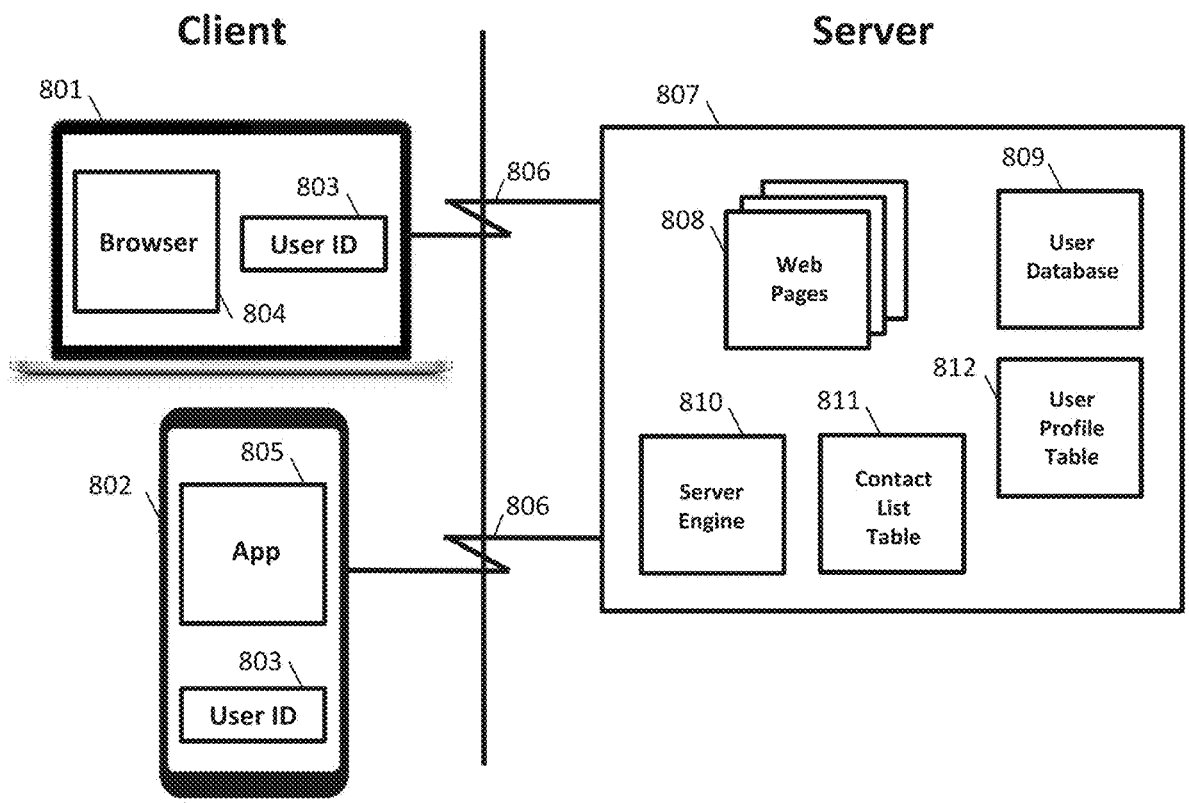
FIG. 5 is a network block diagram illustrating an embodiment of the present invention.

FIG. 5 is a network diagram of one embodiment of the present invention. This embodiment supports the generating and displaying an individual personalized profile to each contact over the Internet. The server system (807) includes a server engine (810), a user database (809), a contact list table (811), a user profile table (812), and in one embodiment various Web pages (808). In one embodiment, the server engine receives HTTP requests to access Web pages identified by URLs and provides the Web pages to the various client systems. Such an HTTP request may indicate that the user has performed actions to generate an individual personalized profile to each contact. The user database (809) contains user information. The user information includes the client identifier and the user action history. The contact list table (811) contains an entry for each contact included in the list of contacts available for users to connect with. The user profile table (812) contains an entry for each profile that was generated by the user to be shared with a contact. In one embodiment, the client system (801) contains a browser (804) and its assigned client identifier (803). The client identifier is stored in a file, referred to as a "cookie". In one embodiment the client system (802) contains an application system (805) and its assigned client identifier (803). The application system provides various pages to the user and sends requests to the server engine. Such application system requests may indicate that the user has performed actions to generate an individual personalized profile to each contact. In one embodiment, the server system assigns and sends the client identifier to the client system once when the client system firsts interacts with the server system. From then on, the client system includes its client identifier with all messages sent to the server system. So that the server system can identify the source of the message. The server and client systems interact by exchanging information via communications link (806), which may include transmission over the internet.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

What is claimed is:

1. A method for displaying an individual personalized profile to one or more contacts on an application, the method comprising:

obtaining from at least one individual on the application a plurality of individual profiles ranked from the most to the least private by the at least one individual;

obtaining one or more contacts;

displaying the one or more contacts to the at least one individual and obtaining the at least one individual's permission to share at least two individual profiles of the plurality of the individual profiles with the one or more contacts;

categorizing individual data of the plurality of individual profiles into different category levels defining a category level one, and a category level two;

defining rules to combine, remove, and prioritize category level one and category level two individual data from the at least two individual profiles shared with the one or more contacts;

displaying to the one or more contacts an individual personalized profile comprising the individual data aggregated combined from the most private individual profile, the second most private individual profile and the third most private individual profile of the plurality of individual profiles.

2. The method of claim 1, wherein the application comprises a web browser and a web server.

3. The method of claim 1, wherein the application is a computer program.

4. The method of claim 1, wherein the application is a social media platform.

5. The method of claim 1, wherein the application is a messaging platform.

6. The method of claim 1, wherein at least one of the one or more contacts is an individual with whom a user can eventually exchange messages with via the application.

7. The method of claim 1, wherein at least one of the one or more contacts is a contact directory shared by an individual who joined the application.

8. The method of claim 1, wherein at least one of the one or more contacts is a contact directory stored in the application.

9. The method of claim 1, wherein at least one of the one or more contacts comprises contacts added manually by an individual to the system.

10. The method of claim 1, wherein the individual data is a phone number.

11. The method of claim 1, wherein the individual data is an email address.

12. The method of claim 1, wherein the individual data is an image.

13. The method of claim 1, wherein the individual data is a surname.

14. The method of claim 1, wherein the individual data is a birth date.

15. The method of claim 1, wherein the category level one includes an individual data image and surname.

16. The method of claim 1, wherein the category level two includes an individual data birth date.

17. The method of claim 1, wherein a rule for category level one individual data comprises displaying category level one individual data from the most private individual profile.

18. The method of claim 1, wherein a first rule for category level two individual data comprises displaying category level two individual data from the most private individual profile, and a second rule for category level two individual data comprises displaying category level two individual data from the second most private individual profile if the most private individual profile does not contain any category level two individual data.

* * * * *